United States Patent Office 3,310,348
Patented Mar. 21, 1967

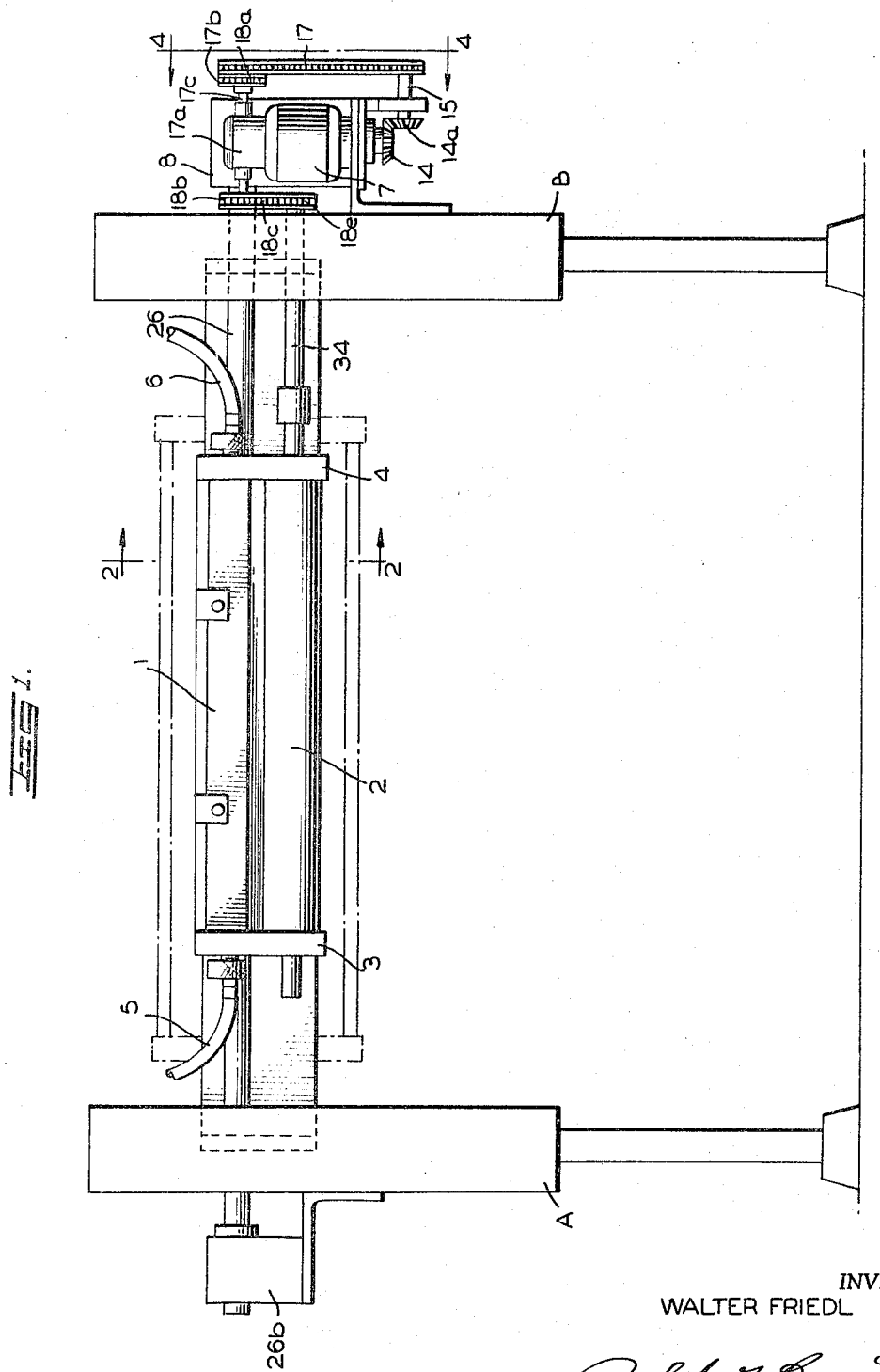

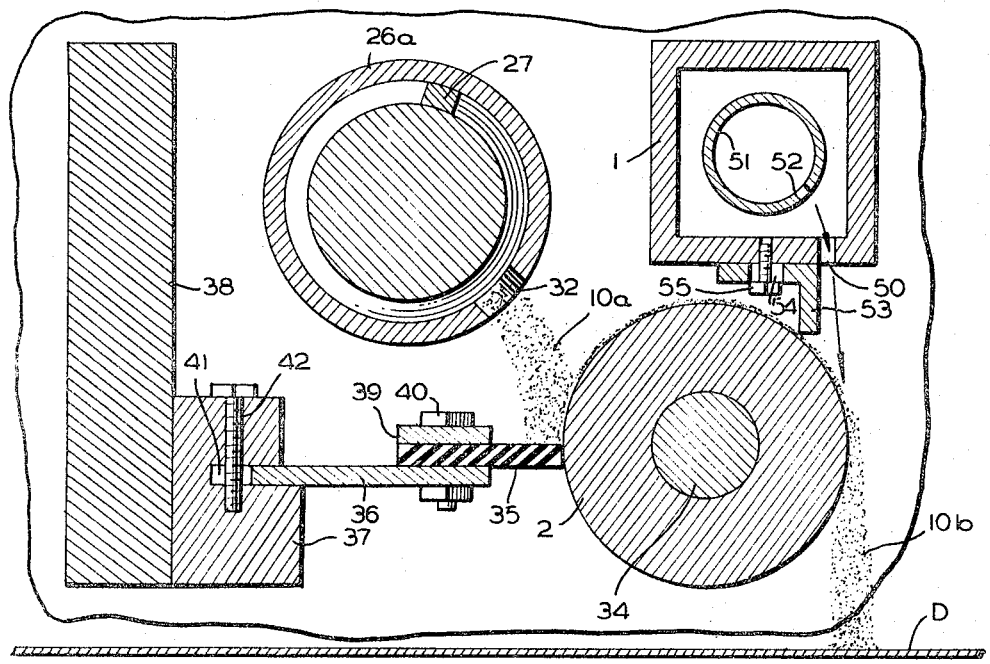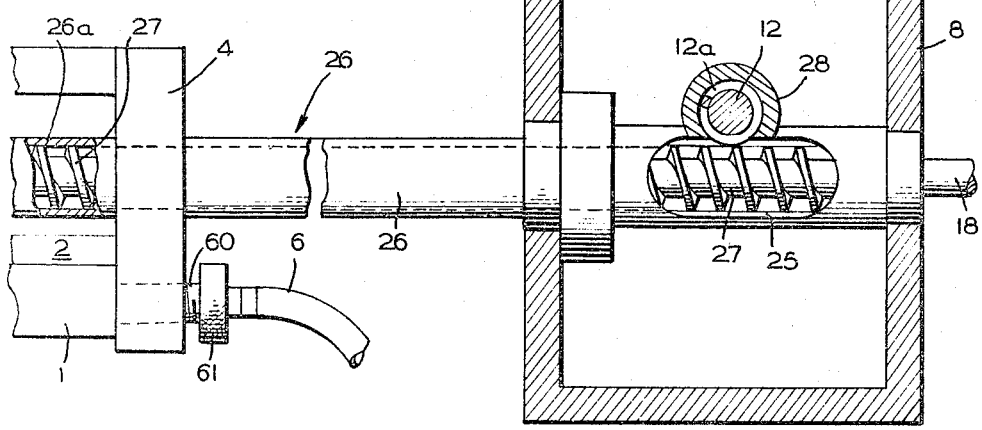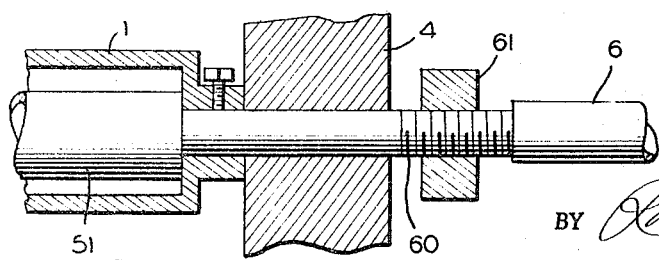

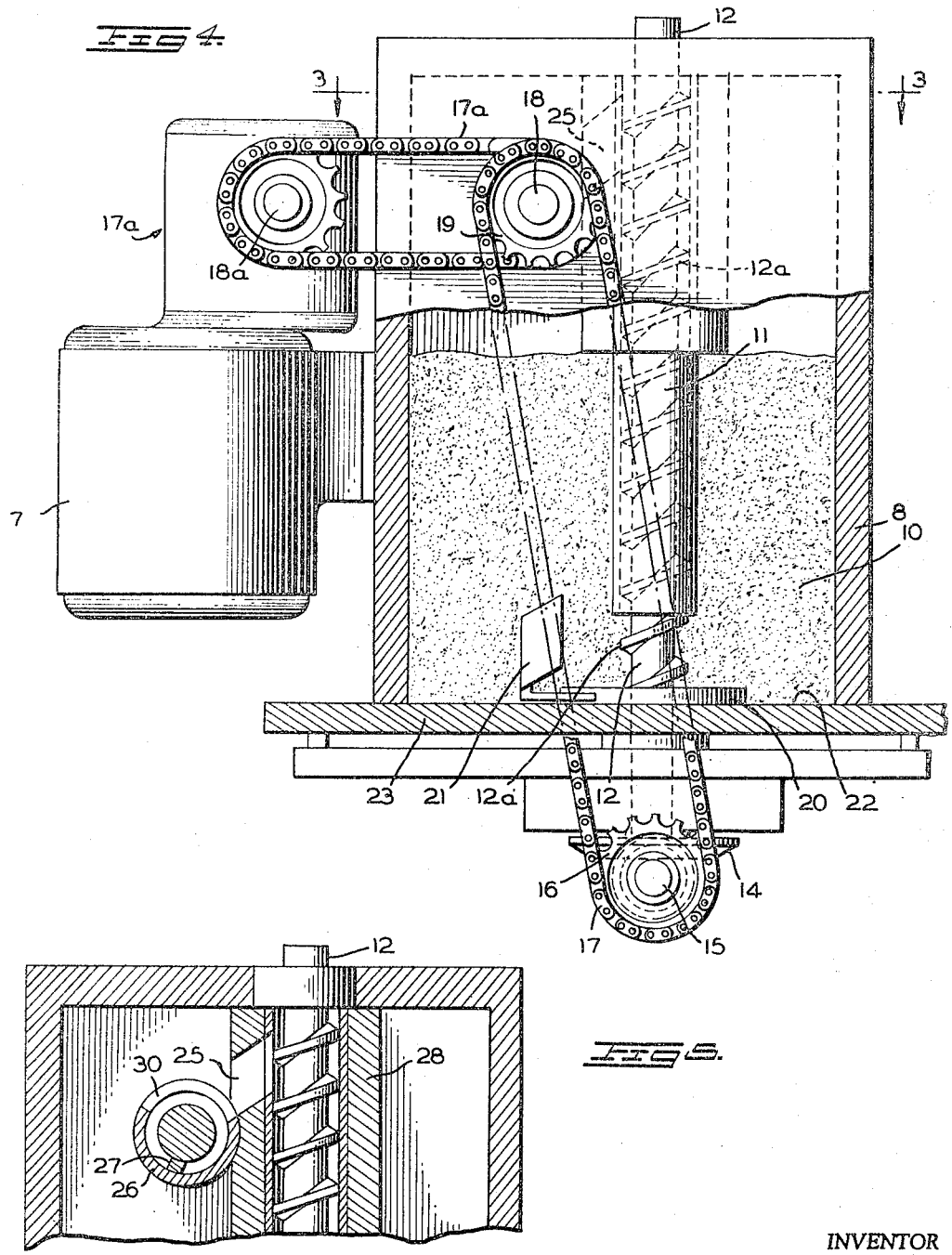

3,310,348
POWDER SPRAY UNITS
Walter Friedl, 8873 N. Port Washington Road,
Milwaukee, Wis. 53217
Filed Oct. 18, 1965, Ser. No. 497,003
6 Claims. (Cl. 302—19)

This invention relates to improvements in powder spray units, particularly for use in offset printing.

One of the main objects of the instant invention is to provide a powder spray unit for spraying such material as starch or wax powder, the unit being particularly adaptable for use in connection with offset printing and including a structure permitting the convenient adjustment of the unit to any width required without loss of time.

More specifically, the invention comprehends the use of an assembly which can be attached to an appropriate offset printing press, the assembly including a source of powder provided with a screw feed for delivering the powder vertically to a feeder tube which discharges the powder to an appropriate roller at a point approximating the junction of a wiper plate with said roller, the powder accumulating on the rotating roller for the action of an air blast or spray which is provided from an assembly in a manner to project the powder in a controlled manner from the roller to the paper, the air furnished by the air tube being balanced by the provision of air inlets at each end of the air tube, whereby a balanced controlled air spray is provided for discharging the powder from the roller to the paper.

These and other objects of the invention will more clearly hereinafter appear by reference to the accompanying drawings forming a part of the instant specification and wherein like characters of reference designate corresponding parts throughout the several views, in which:

FIG. 1 is a front elevation of an assembly showing the invention;

FIG. 2 is a transverse section on line 2—2 of FIG. 1;

FIG. 3 is a fragmentary top plan view, partly in section, showing the feeder mechanism;

FIG. 4 is an end elevation, partly in section, on line 4—4 of FIG. 1;

FIG. 5 is a fragmentary section showing the delivery screws for the powder; and

FIG. 6 is a fragmentary section showing the mounting of the air box and the air tube therein.

Referring to FIG. 1, a mounting assembly is shown to include the upright standards A and B to be positioned at each side of a press assembly, although it is to be understood that the instant invention may be attached by brackets connected to other parts of a press assembly. The instant invention includes an air box 1, powder carrier roller 2, end supporting brackets 3 and 4, air supply tubes 5 and 6 connected to each end of the air box 1, a source of power in the form of an electric motor 7 mounted at one end of the assembly adjacent a powder supply chamber 8 from which powder is delivered by a feed screw.

The feeding of the powder is best illustrated in FIG. 4 in which the powder supply chamber 8 is shown provided with an appropriate quantity of powder 10 which may be starch, wax or other material appropriate for the spraying or dusting of printed sheets of paper, as for instance for the purpose of preventing the sheets from adhering to each other when stacked in a pile as is customary practice. Also appropriate powder may be sprayed upon the sheets of paper delivered from a press to reduce static and for other purposes known in the art.

The powder supply chamber 8 is supplied with a vertical tube 11 in which is positioned the vertical feed screw 12a mounted on shaft 12 which is provided at its lower end with a beveled gear 14 driven by horizontal shaft 15 having a sprocket 16 at one end driven by a chain 17 from the shaft 18 having mounted thereon the sprocket 19. The shaft 18 is driven by sprocket chain 17a which is driven by the motor 7. The feed screw 12a contained in the vertical tube 11 is provided at its lower end with a rotating plate 20 having a sweeper blade 21 to draw the material into and towards the vertical feed screw 12a mounted on shaft 12. The plate 20 is supported on the inner face 22 of the lower wall 23 of the powder supply chamber 8 and the feed screw 12a conveys the powder vertically within the tube 11 to a discharge port 25, shown more clearly in FIG. 5, for discharge into the horizontal tubular casing 26 containing the axially aligned concentric feed screw 27 mounted on the shaft 18. The discharge port 25 is contained in a relatively thick tubular housing 28 positioned about the tube 11 at the upper end thereof and forming a part of the vertical lift assembly, the housing 28 being fixed to the vertical tube 11 by any suitable means so that the discharge port 25 is relatively fixed with respect to the opening 30 formed in the casing 26 of the horizontal feed.

The feed screw 27 is shown in FIG. 3 and is contained within the tubular casing 26 extending from the powder supply chamber 8 transversely through the end frame members 3 and 4 and transversely of the assembly for delivery through the ports 32 in the tubular extension 26a, as shown in FIG. 2. The ports 32 are constructed to discharge downwardly upon the distributing roller 2 mounted on shaft 34. The distributing roller 2 is associated with the horizontal wiper blade 35 clamped to horizontal plate 36 carried by the frame 37 supported by the vertical plate 38. The wiper blade 35 is secured in position by a top plate 39 and bolts 40 which extend through the top plate 39 and the horizontal wiper plate 36, as best shown in FIG. 2. The wiper plate 36 extends into a slot 41 in the frame member 37 and is adjustably secured in position by vertical bolts 42. The wiper blade 35 distributes the powder or other spray material 10a discharged through the openings 32 in the tubular housing 26, the perforations being of suitable dimension and appropriately spaced for the proper discharge of the spray material by the screw 27. The feeding of the powder or spray material 10a by the screw 27 is constant and the surplus material is discharged through the tubular extension 26a into a suitable receptacle 26b for re-use at the end of the screw 27, the spray material in the casing 26 being kept constantly under pressure from the screw 27 to maintain available powdered material for discharge through the openings 32 in a manner to maintain a constant and continuous flow of the spray material.

The spray material 10a discharging from the distributing screw 27 through the openings 32 is picked up by the distributing roller 2 and advanced about the roller which is rotating clockwise about the shaft 34. Immediately above the roller is a main air chamber 1 shown as an elongated box-like structure provided with a longitudinally extending slot 50 in the forward part of its bottom wall. Within the air chamber or box 1 is the air conduit 51 which is provided at each end with the air supply tubes 5 and 6 to distribute air thereto, the introduction of air at each end under pressure tending to maintain constant pressure in the air tube 51 and without pulsations for discharge through the longitudinally extending ports 52 which discharge the air into the air chamber and downwardly in the direction of the longitudinally extending air slot 50 in the bottom of the air chamber 1 where the air projects tangentially across the pick-up roller 2 and discharges the accumulated spray material on the roller 2 downwardly toward the paper D which is traveling from the printing press.

The slot 50 in the air chamber 1 is so positioned as to properly project a constant continuous jet of air across the pick-up roller 2 and this slot 50 can be adjusted by the sliding plate 53 in the form of an angle member having slots 54 in its horizontal leg for the passage of the bolts 55 which project into the lower wall of the air chamber 1. The bolts 55 can be loosened and the gauge or sliding plate 53 can be adjusted forward or aft to regulate the size of the discharge port or slot 50 in the lower wall of the air chamber 1 so that the slot 50 can be regulated in accordance with requirements and in accordance with the type of dusting material which is being projected downwardly upon the paper D.

It will be noted from FIG. 3 that the air chamber 1 has terminal tubular screw connectors at each end into which the hose terminals of the air pressure pipes 5 and 6 extend through frame members 3 and 4 and are connected by screw jam nuts 60 having heads 61 threaded on the screw connectors to engage the frame members to permit the air chamber to be rotated on its axis and locked in rotated position, whereby the air chamber is adjusted on its axis and the position of the ports 52 moved with respect to the slot 50 of the air chamber 1 to modify the air flow in accordance with requirements.

In operation of the device the spray unit will be mounted in any suitable position on an offset printing press so as to be appropriately associated with the printed paper traveling from the press under control of appropriate gripping rolls, as is conventional in the art, the normal position of the spray unit being between the gripping rolls. It will understood that the present spray apparatus can be mounted in any manner required by the particular installation depending upon the model and type of offset printing press. Likewise, the source of power, i.e. the electric motor or motors, will be provided in accordance with the size of the press and the requirement of the equipment.

In the present instance and for the purpose of illustration, an electric motor is shown at 7, this motor driving through the gear box 17a the sprocket chain 17 and sprocket gear 16 mounted on the shaft 15. The shaft 15 is provided with a sprocket gear 14a meshing with the sprocket gear 14 on the lower terminal of the feed screw shaft 12 carrying the feed screw 12a contained in the vertical tube 11. By the association of the sweeper blade 21 the spray material 10 in the chamber 8 is lifted by the screw 12a through the tube 11 and is discharged through a downwardly inclined port 25 shown in FIG. 5 onto a horizontal screw 27 in the tubular housing 26, the screw 27 evenly distributing the spray material lengthwise of the housing extension 26a, which latter is provided with ports 32 whereby the spray material is discharged downwardly, as shown at 10a in FIG. 2, onto the distributing roller 2 mounted on shaft 34.

The roller 2 may be driven from a separate source of power, although in the present illustration it is shown as connected through the gear box 17a to the motor 7. The roller 2 is associated with the plastic wiper blade 35 mounted on the supporting plate 36 and may be adjusted with respect to the roller 2, as will be obvious from an inspection of FIG. 2. The roller 2, driven at a predetermined speed in accordance with requirements, picks up the powder from the feeder tube extension 26a and carries it to the outside where an air blast from the air box 1 blows tangentially downwardly across the roller 2 and blasts a layer of powder on the printed sheet of material indicated at D.

The air chamber or box 1 is supplied with air under pressure, generally from 2 to 15 lbs., in accordance with requirements. It will be noted that the air box 1 includes the inner supply tube 51 connected at each end to a suitable air source through the supply tubes 5 and 6, the supply of air at each end providing a more uniform balanced pressure. The ports in the supply tube 51 may approximate 1/16" in diameter suitably spaced apart throughout the length of the tube within the air box 1 and the air from the box 1 will be discharged through the air slot 50 in the lower front portion of the bottom of the air box, the opening 50 in the air box 1 being adjustable and in the form of a slot approximating .005" to .015" throughout its length to maintain proper control of the air volume and pressure.

The air discharging from the slot 50 in the bottom of air box 1 will blast tangentially across the roller 2 and blow the layer of powder accumulated on the roller 2 to the printed sheet or other printed material D. The coating powder blown from the roller 2 will prohibit any smearing of the printing and will absorb the moisture in the ink or any coating material on the printed sheet. The air box 1 is adjustable, as previously noted, to provide the proper angular projection of the air blast by the use of screws or the like, the box 1 being fixedly mounted on the pipe extensions connecting with the inner air tube 51.

The air box 1 and the air duct 51 contained therein and the parts thereof are removably connected with the frame elements 3 and 4 and can be moved out through the front of the assembly to permit appropriate cleaning. By having the closed end air box 1 adjustable the direction of the air blast through the slot 50 can be arranged for providing an appropriate spray onto the paper D and the air blast can also be used for cleaning purposes, as is customary in the art.

It will be noted by reference to FIGS. 1 and 4 that the gear box 17a is provided with power shafts extending in opposite directions, one power shaft driving the sprocket 18b for driving the roller 2 through sprocket 18e, and the other power shaft 17c driving through sprocket chain 17 the vertical screw 12a. It will also be noted that the horizontal feed screw 27 discharges surplus powdered material into the waste material receptacle 26b at the opposite end of the assembly.

What is claimed is:

1. In a powder spray unit for applying a powder to a printed sheet traveling from an offset printing press, the combination of supporting means and a receptacle for containing powder, a vertical feed screw enclosed in a housing and positioned in said receptacle for lifting the powder to a predetermined position, a horizontal feed screw contained in a cylindrical housing for receiving the powder from the vertical feed screw and distributing the same throughout the horizontal housing, longitudinal discharge port means in said horizontal feed screw housing for discharging the powder spray downwardly, an elongated roller mounted in said supporting means below said horizontal feed screw and having an adjustable wiper blade engaging the same at one side and being adapted to receive the powder spray discharged from said horizontal housing for transmission to the opposite side of said roller, means for driving said roller, a closed air box positioned above said roller, an air tube extending medially through said closed air box, means for supplying air to said air tube at each end thereof, ports in said air tube for delivering air into said box, a slot at the bottom of said box for projecting air spray therefrom tangentially downward across said roller for dispersing the powder carried by said roller downwardly upon the traveling printed sheet, means for adjusting said box to vary the angle of said projecting air spray, additional means for regulating the thickness of said slot in said box for modifying the discharge of air, and means for driving said feed screws.

2. The structure of claim 1 characterized in that the vertical feed screw positioned in said powder receptacle is provided at its bottom portion with a wiper blade to direct the powder towards said feed screw.

3. The structure of claim 1 characterized in that means are provided for rotating the air box and the air tube extending medially through said air box relative to each other for varying the position of the ports in said air tube and the slot in the bottom of said box.

4. The structure of claim 1 characterized in that the slot at the bottom of the air box for projecting air spray therefrom across the roller is associated with an adjustable sliding member to vary the diameter of the slot to modify the air spray.

5. The structure of claim 1 characterized in that the wiper blade associated with the elongated rotating roller extends horizontally of the roller and is horizontally adjustable towards and away from said roller.

6. The structure of claim 1 characterized in that the powder material is discharged from the vertical feed screw enclosed in its housing into the housing containing the horizontal feed screw by gravity through an inclined discharge port.

References Cited by the Examiner
UNITED STATES PATENTS

| | | | |
|---|---|---|---|
| 3,061,150 | 10/1962 | Lindquist | 118—308 |
| 3,114,482 | 12/1963 | Dunaway | 118—308 |
| 3,238,919 | 3/1966 | Meyer | 118—308 |

ANDRES H. NIELSEN, *Primary Examiner.*